United States Patent [19]

Furmaga

[11] 4,114,529

[45] Sep. 19, 1978

[54] SAFETY STRUCTURE

[76] Inventor: Walter V. Furmaga, 14123 Barbara, Livonia, Mich. 48154

[21] Appl. No.: 646,143

[22] Filed: Jan. 2, 1976

[51] Int. Cl.² .............................................. F16P 1/00
[52] U.S. Cl. ........................................ 100/53; 72/456; 74/608
[58] Field of Search ...................... 308/3.5, 5; 425/151; 100/53, 214, 257; 64/32 F; 74/608, 612, 613, 615, 17.8; 72/456; 92/47, 42; 138/119, 121, 122

[56] References Cited

U.S. PATENT DOCUMENTS

| | | | |
|---|---|---|---|
| 730,791 | 6/1903 | Nightingale | 74/608 |
| 818,172 | 4/1906 | Hill | 100/53 |
| 1,387,553 | 8/1921 | Miller | 74/612 |
| 2,061,331 | 11/1936 | Roberts | 74/608 |
| 2,089,938 | 8/1937 | Bertrand | 74/615 |
| 2,141,027 | 12/1938 | Wiesman | 74/615 |
| 2,186,440 | 1/1940 | Williams | 138/122 |
| 2,320,240 | 5/1943 | Janiszewski | 308/5 R |
| 2,576,112 | 11/1951 | Gordon | 74/612 |
| 2,903,840 | 9/1959 | Teupel | 74/608 |
| 2,961,007 | 11/1960 | Martin | 138/122 |
| 3,017,822 | 1/1962 | Hawley | 100/240 |
| 3,575,103 | 4/1971 | Charles | 92/47 |

Primary Examiner—Billy J. Wilhite
Attorney, Agent, or Firm—Whittemore, Hulbert & Belknap

[57] ABSTRACT

A guard sleeve for die stop blocks, guide posts and the like, including an elongated, accordion shaped, plastic sleeve having resilient wire reinforcing therein and means for securing the opposite ends of the sleeve over die stop blocks, guide posts and the like to prevent accidental placing of objects in the space defined by the guard sleeve, and the method of producing the guard sleeve with a rectangular cross section comprising constructing the guard sleeve with a circular cross section and permanently deforming the guard sleeve with the circular cross section along longitudinally extending lines angularly spaced apart on the guide sleeve circular cross section.

12 Claims, 11 Drawing Figures

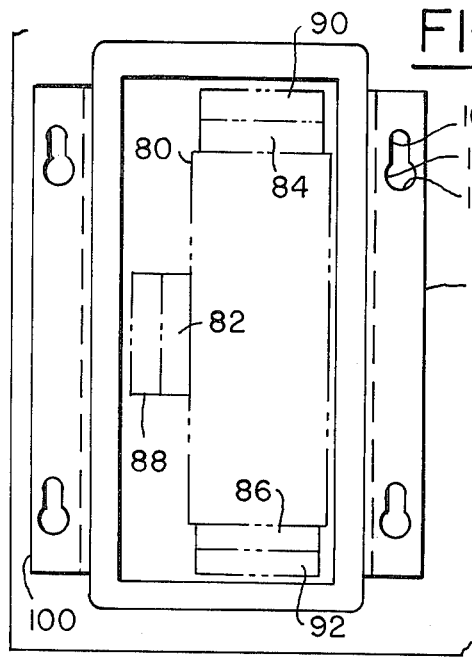
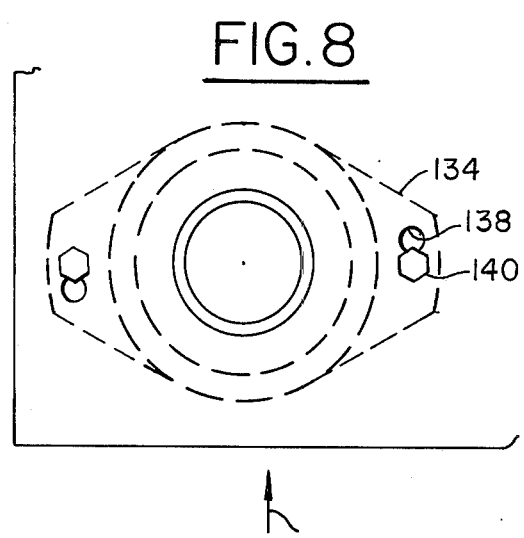
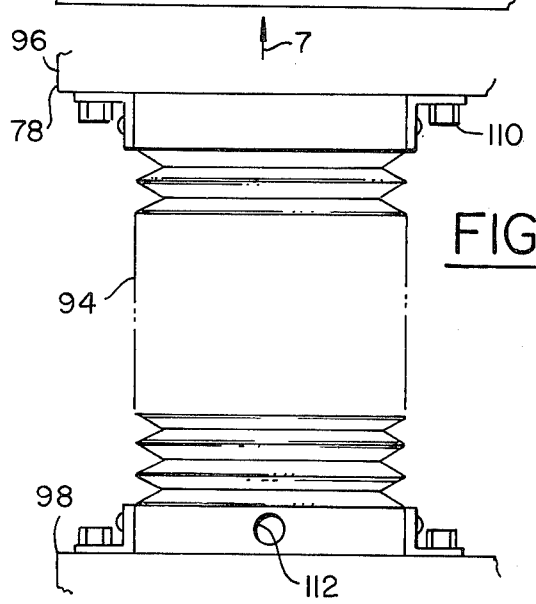
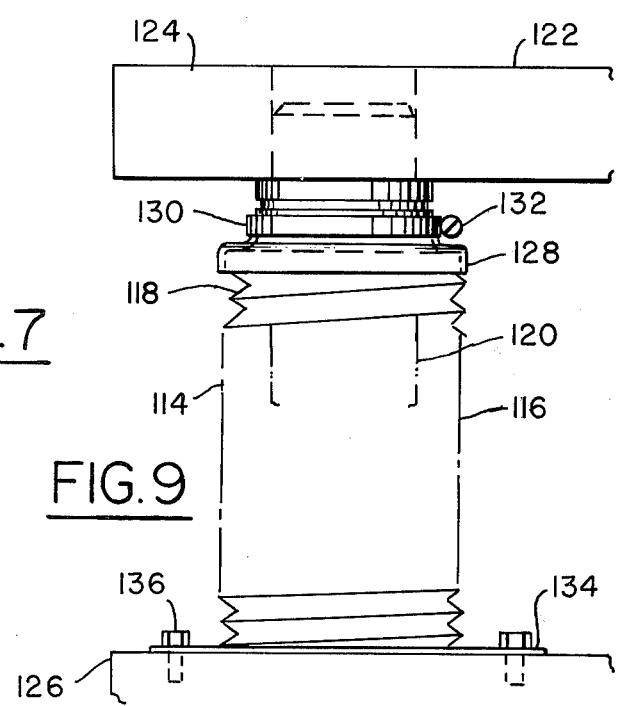
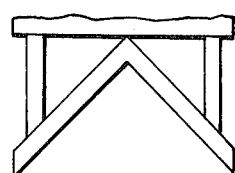
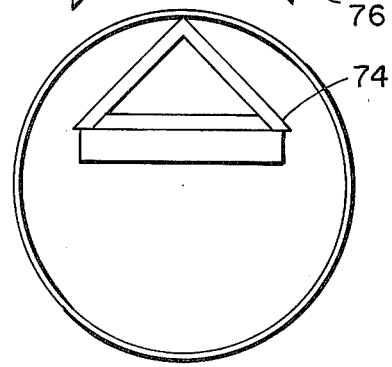

SAFETY STRUCTURE

BACKGROUND OF THE INVENTION

1. Field of the Invention

The invention relates to safety structures and refers more specifically to a guard sleeve for die stop block and guide post structure for preventing accidental placement of members on stop blocks or between guide post and/or guide pin members of an open die set to prevent damage or injury on closing of the die set.

2. Description of the Prior Art

In the past, stop blocks, guide posts and guide pins of die sets have been protected in a variety of fashions. Thus, telescoping metal guards have been connected at opposite ends over guide posts and accordion pleated flexible members have been connected at opposite ends over guide posts. Springs have been positioned around die parts extending therebetween and resilient material such as foam rubber has sometimes been positioned between the opposing members of die sets to prevent accidental entry of foreign objects between the die sets. Each of these prior art structures has particular disadvantages, the telescoping metal cylinders are expensive and are subject to deformation, rendering them inoperative. Accordion pleated plastic guard sleeves have not been rigid enough to prevent lateral deformation thereof and thus pinching of articles between opposed die parts and the springs and the resilient material positioned between opposed die parts prevent adequate access to the die parts and are expensive to produce and install.

SUMMARY OF THE INVENTION

In accordance with the invention, a guard sleeve is positioned between parts of die structures to prevent placing of objects between the parts of the die structures. The guard sleeve includes an elongated plastic sleeve which is accordion shaped. Resilient wire reinforcing is provided in the plastic sleeve to increase the rigidity thereof and means are provided at the opposite ends of the sleeve for securing the opposite ends of the sleeve to separate die structure parts on the upper and lower platen of a die set with guide posts or the like to be protected within the guard sleeve. The guard sleeve may be square, rectangular or circular in cross section as desired. The resilient wire reinforcing may be spiral or may be separate circular or rectangular endless members extending around the outer diameter of the larger diameter of the accordion shaped plastic sleeve.

Square and rectangular cross section guard sleeves are produced in accordance with the method of the invention by first producing a circular cross section guard sleeve, placing linear marks on the circular guide sleeve longitudinally thereof wherein it is desired to create corners of the rectangular or square cross section guard sleeve, placing the circular cross section guide sleeve between opposed dies extending longitudinally of the guide sleeve and causing the dies to approach each other to permanently deform the reinforcing members along the linear marks.

BRIEF DESCRIPTION OF THE DRAWINGS

FIG. 5 is an enlarged partial view of a portion of FIG. 3, particularly illustrating the structure for securing the ends of the guard sleeve to a portion of a die set or the like.

FIG. 6 is a plan view of die structure showing different guide structure including a guard sleeve surrounding the guide structure.

FIG. 7 is an elevation view of the guide structure and guard sleeve illustrated in FIG. 6, taken in the direction of arrow 7 in FIG. 6.

FIG. 8 is a plan view of die structure having a guide pin and a guard sleeve constructed in accordance with the invention placed over the guide pin.

FIG. 9 is an elevation view of the die set and guard sleeve illustrated in FIG. 8, taken in the direction of arrow 9 in FIG. 8.

FIG. 10 is an elevation view of structure for forming rectangular cross section guard sleeves in accordance with the method of the invention in an open position.

FIG. 11 is an elevation view of the structure shown in FIG. 10 in a closed position.

DESCRIPTION OF THE PREFERRED EMBODIMENTS

Figure 1:
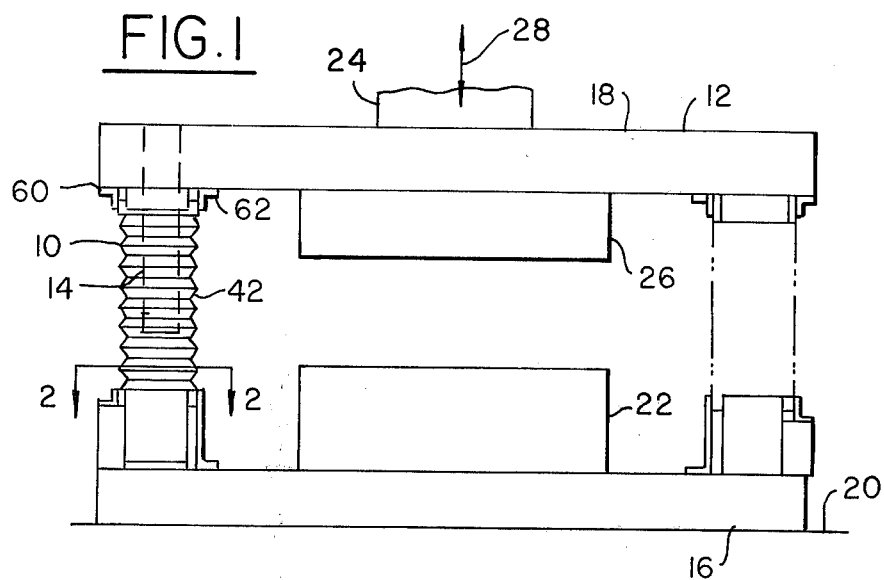
FIG. 1 is a front elevation view of a die set having corner guide posts, each having a separate guide sleeve in conjunction therewith, constructed in accordance with the invention.

As shown in FIG. 1, the safety guard sleeves 10, constructed in accordance with the invention, are provided at each corner of a die set 12 over guide posts 14 positioned at each corner of the die set 12.

The die set 12 includes a lower platen 16 and an upper platen 18. The lower platen 16 may be held in a fixed position on a table 20 and supports a lower die block 22. The upper platen 18 may be supported by ram means 24 and supports the upper die block 26. The upper platen 18 of the die set 12 is reciprocally movable in the direction of arrows 28 to bring the die blocks 22 and 26 into close proximity for forming metal or the like in a known manner.

The guide posts 14 at the four corners of the die set 12 may be identical. Therefore, only one of them will be considered in detail. The guide post 14 is rigidly secured to the upper platen 12 into which it extends, as shown best in FIG. 1. Wear plates 30 and 32 are secured thereto by convenient means such as bolts or the like (not shown).

Wear plates 34 and 36 are supported on blocks 38 and 40, which in turn are secured to the lower platen 16 at each corner of the lower platen 16, as shown.

Such structure is usual in large die sets 12 and is used to align the die blocks 22 and 26 on downward movement of the upper platen 18, as shown in FIG. 1.

With such structure there is, however, a danger of workmen placing their hands or arms over the blocks 38 and 40 or laying a tool on the blocks 38 and 40 prior to the downward movement of the upper platen 18. There is, then, danger of personal injury to the operator or damage to the tools and/or die set 12 when these things occur. Accordingly, the guard sleeve structure 10 has been provided and when installed over the guide post 14 will prevent placing anything beneath the guide post 14, so that there is no danger of pinching anything between the wear blocks 30 and 34 and 32 and 36 when the guide post 14 is moved downward with the upper platen 18.

The guard sleeve 10 includes a plastic sleeve 42 which is accordion in shape, as shown best in FIG. 1. The plastic sleeve is made of a relatively thin sheet of flexible plastic and can be extended and contracted accordion fashion with the movement of the platen 18.

Figure 3:
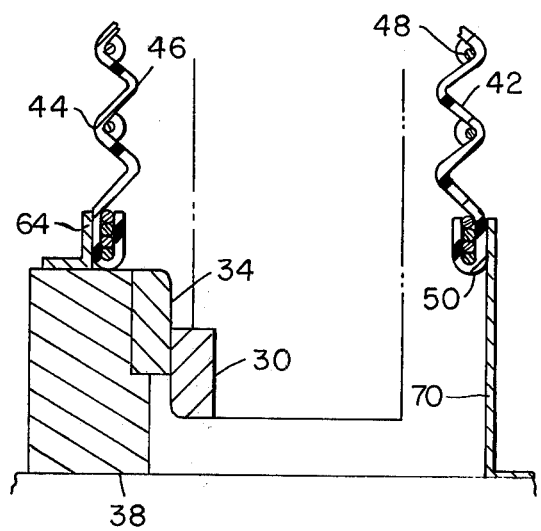
FIG. 3 is a partial section view of the portion of the die set illustrated in FIG. 2, taken substantially on the line 3—3 in FIG. 2.

As shown in FIG. 3, the plastic sleeve has alternate large diameter and small diameter portions 44 and 46, respectively. Resilient steel wire reinforcing members 48 are molded into the sleeve 42 at the large diameter portions thereof to provide added lateral strength for the sleeve 42.

Alternatively, the sleeve 42 may have the accordion portions in a spiral configuration, and the wire reinforcement may be a continuous, generally helical wire in the large diameter portions of the sleeve, as shown best in the modified guard sleeve of FIG. 9. The structure of FIG. 9 is somewhat easier to manufacture and provides greater lateral rigidity for the guard sleeve, since the wire reinforcing is continuous.

Figure 4:
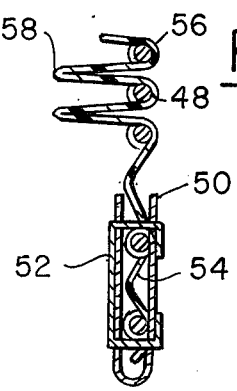
FIG. 4 is an enlarged partial view of a portion of FIG. 3, particularly illustrating the means for terminating the ends of the guard sleeve of the invention and showing the guard sleeve in collapsed position.

At each of the guard sleeve 10 there is provided an annular terminating collar 50 which is generally U-shaped in cross section to receive an end of the reinforced plastic sleeve 42, as shown best in FIG. 4. The plastic sleeve is stapled to the terminating collar 50 by means of staples 52 spaced angularly thereabout. Also, as shown best in FIG. 4, it will be noted that the end of the plastic sleeve 42 within the terminating collar 50 is expanded to some extent so that the plastic does not become too bulky in the collar 50. As shown in FIG. 4, the end 54 of the sleeve 42 is extended, while the portion 56 thereof is not. Thus, the portions 58 of the plastic sleeve between the reinforcing members 48 in the portion 56 of the guard sleeve 10 extend transversely of the sleeve rather than substantially axially thereof as in the expanded portion 54.

The ends of the guard sleeve 10 may be secured to the upper platen 18 of the die set 12 by convenient means such as the L-shaped brackets 60 and 62 illustrated in FIG. 1. These brackets are similar to the L-shaped brackets shown in FIGS. 6 and 7, which will be considered later, and are constructed to permit quick release of the guard sleeve when desired.

The bottom of the guard sleeve 10 is secured to the blocks 38 and 40 by similar L-shaped brackets 64 and 66 and by the extended brackets 68 and 70 on the two sides of the guide post 14 on which there are no blocks 38 and 40. If considered desirable, the brackets 68 and 70 may extend to completely enclose the end of the guide post 14 in the lowermost position thereof in conjunction with the blocks 38 and 40.

Figure 5:
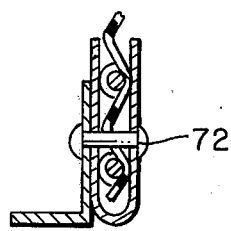

As shown in FIG. 5, the ends of the guard sleeve 42 are secured to the brackets by convenient means such as rivets 72 spaced intermediate the staples 52, as desired. It will be understood that other means for securing the ends of guard sleeve 10 to the upper and lower platens 18 and 16 of the die set 12 may be utilized within the scope of the invention.

In overall use of the die set 12, when the platens 16 and 18 are separated, it will be substantially impossible to place anything beneath the guide posts 14 which may be damaged on lowering of the guide posts 14. Further, even if some lateral pressure is used to deform the guard sleeve 10 in its extended position, it has been found that due to the wire reinforcing therein that as the upper platen 18 approaches the lower platen 16, there is a build up of lateral forces causing the guard sleeve to exert a lateral force tending to move whatever is deforming the guard sleeve laterally out of the way of the guide post 14. This is especially true in the case of the spirally constructed and reinforced safety guard sleeve as illustrated in FIG. 9.

Figure 2:
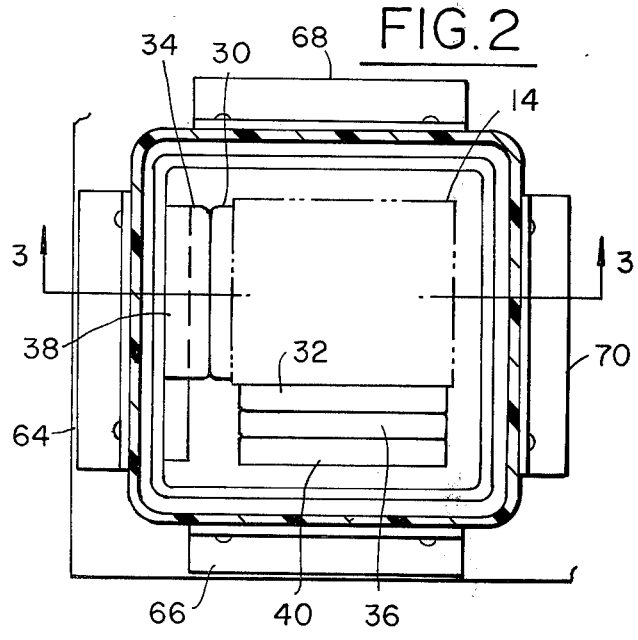
FIG. 2 is an enlarged section view of a portion of the die set illustrated in FIG. 1, taken substantially on the line 2—2 in FIG. 1.

As shown best in FIGS. 10 and 11, in making the guard sleeve shown in FIGS. 1-3 and that shown in FIGS. 6 and 7, the guard sleeve 10 is first constructed with a circular cross section for ease of construction, and longitudinally extending linear marks are placed on the sleeve where the corners of the rectangular cross section are desired. After the plastic sleeve is bonded to the wire reinforcing and marked, it is, in its expanded condition placed longitudinally on a V-shaped lower die member 74, as shown in FIG. 10, and a mating longitudinal guide part 76 is caused to deform the circular cross section of the guard sleeve along one of the marks on the sleeve, as shown in FIG. 11, to provide a corner for the guard sleeve. The guard sleeve, as shown in FIGS. 10 and 11, is then rotated, for example, 90°, to produce a square guard sleeve, and the corner forming process is again accomplished. When each of the four corners have been formed, the guard sleeve is removed from between the dies 74 and 76 and is ready to have the terminating collars 50 secured thereto. It will be understood, of course, that in the method of forming rectangular safety guard sleeves with the die members 74 and 76, that the curvature of the sides of the rectangular guard sleeves and the radius of the corners may be completely controlled by, for example, placing reverse curvature on the die members 74 and 76 so that the spring back of the reinforcing wire will produce the ultimate shape. That is, straight rather than arcuate sides.

Further, it will be understood that the application of the guard sleeve 10 is not limited to the structure illustrated in FIG. 1. Thus, for example, the safety guard sleeve 10 may be secured between upper and lower platens of a die set 78, as shown in FIGS. 6 and 7, which die set 78 will normally be smaller, and the guide posts 80 will be a single member extending between two sides of the die set 78 in place of a pair of spaced apart corner guide posts. In such construction, as shown in FIGS. 6 and 7, a single wear plate 82 is provided at one side of the die set, while wear plates 84 and 86 are also provided at each end of the die set on opposite sides thereof with the guide posts 80 extending therebetween. Mating blocks and wear members 88, 90 and 92 are provided in conjunction with the guide post 80 in such known constructions, and the modified safety guard sleeve 94 is connected to the upper and lower platens 96 and 98 of the die set 78, again by metal angle members 100 and 102. Guard sleeve 94 is modified in that it is rectangular and includes an air exhaust opening in conjunction therewith.

As shown best in FIG. 6, the openings 104 in the angle brackets 100 and 102 are provided with enlarged circular portions 106 at one end thereof and smaller slots 108 in the other end thereof whereby bolts 110 which extend into the platens may be inserted through the circular portions 106 of the openings 104, after which the angle member, for example 102, may be moved axially to place the threaded portion of the bolt within the slot 108 and the bolt tightened. This structure permits rapid release of the entire safety guard sleeve at either end thereof for inspection of or maintenance of the guide posts 80 without removing the bolts 110. Such structure may, as indicated, be included in conjunction with the guard sleeve 10.

Also, it will be noted that an air exhaust opening 112 is provided in conjunction with the guard sleeve 94 to prevent deforming of the guard sleeve 94 on movement of the upper platen 96 toward the lower platen 98. Such exhaust opening is not necessary in conjunction with the guard sleeve 10, since adequate escape of air may be provided between the blocks 38 and 40 or the extended brackets 68 and 70 to prevent deformation of the guard sleeve 10 on closing of the die set 10.

A further modification of the guard sleeve 10 is shown in FIGS. 8 and 9. Thus, as previously considered, the plastic sleeve 114 is spirally constructed with a spiral resilient steel reinforcing wire 116 therein.

Further, the upper end of the guard sleeve 114 is secured to the guide pin 120 adjacent the upper platen 122 of a die set 124, which also includes the lower platen 126 on a double diameter plastic collar 128. The plastic collar 128 is connected to the die pin 120 by a clamp 130 such as an enlarged automobile hose clamp which may be tightened by screw means 132.

The bottom of the safety guard sleeve 114 is secured to the lower platen 126 of the die set 124 by the lower metal flange member 134, having a plan view as shown best in FIG. 8. As shown, the bottom metal retainer 134 may be quickly released on releasing bolts 136 by applying a rotary motion to the retainer 134 to place the bolts 136 in the enlarged portions 138 of openings 140.

While one embodiment of the present invention has been considered in detail, it will be understood that other embodiments and modifications thereof are contemplated by the inventor. It is the intention to include all such embodiments and modifications as are defined by the attached claims within the scope of the invention.

What I claim as my invention is:

1. In combination, a die set including an upper and lower platen, guide means on the upper and lower platen capable of damaging anything positioned therebetween on closing of the die set, and a guard sleeve including an elongated, accordion shaped, flexible plastic cylinder open to atmospheric pressure, and resilient means for laterally reinforcing the cylinder secured to the cylinder, positioned over the guide means, means securing one end of the sleeve to one platen of the die set and means securing the other end of the sleeve to the other platen of the die set whereby placement of objects between portions of the guide means with the die set open is guarded against.

2. Structure as set forth in claim 1, wherein the reinforcing means are continuous resilient members extending in a plane substantially perpendicular to the extent of the sleeve, which members are contained in the large diameter portions of the sleeve.

3. Structure as set forth in claim 1, wherein the guard sleeve is rectangular in cross section.

4. Structure as set forth in claim 1, wherein the guard sleeve is circular in cross section.

5. Structure as set forth in claim 1 wherein the accordion shaped plastic cylinder has large and small diameter portions which are in a spiral configuration and wherein the reinforcing means has a spiral configuration.

6. A guard sleeve comprising an elongated flexible plastic sleeve having alternate large and small diameter portions accordion fashion whereby the sleeve may be expanded and contracted, linear reinforcing means secured to the sleeve adjacent the periphery of the cross section thereof for increasing the rigidity of the sleeve, and means for securing the opposite ends of the sleeve in predetermined positions secured to the opposite ends of the sleeve, including a plastic strip around at least one end of the sleeve having a substantially U-shaped cross section with the one end of the sleeve received therein, and staple means extending through the end of the sleeve and the plastic strip.

7. Structure as set forth in claim 6, wherein the reinforcing means are continuous resilient members extending in a plane substantially perpendicular to the extent of the sleeve, which members are contained in the large diameter portions of the sleeve.

8. Structure as set forth in claim 6, wherein the means for securing the sleeve in a predetermined position further includes an L-shaped bracket having one leg riveted to the plastic strip and means for releasably securing the other leg in a fixed position.

9. Structure as set forth in claim 6 wherein the guard sleeve is rectangular in cross section.

10. Structure as set forth in claim 6 wherein the guard sleeve is circular in cross section.

11. Structure as set forth in claim 6 wherein the alternate large and small diameter portions of the flexible plastic sleeve and the linear reinforcing means have a spiral configuration.

12. In combination, a die set including an upper and lower platen, guide means on the upper and lower platen capable of damaging anything positioned therebetween on closing of the die set, and a guard sleeve including an elongated, accordion shaped, flexible plastic cylinder open to atmospheric pressure, resilient reinforcing means secured to the cylinder positioned over the guide means, means securing one end of the sleeve to one platen of the die set and means securing the other end of the sleeve to the other platen of the die set, comprising a dual diameter collar having a larger diameter portion for receiving the other end of the sleeve and having a smaller diameter portion adapted to fit over a guide pin secured to the other platen and clamp for clamping the smaller diameter portion of the collar to the pin whereby placement of objects between portions of the guide means with the die set open is guarded against.

* * * * *